(12) United States Patent
Soares

(10) Patent No.: US 8,840,012 B2
(45) Date of Patent: Sep. 23, 2014

(54) SYSTEM AND METHOD FOR ACQUIRING AND SHARING SCHEDULING DATA

(71) Applicant: Hugo J. Soares, Rocky Hill, CT (US)

(72) Inventor: Hugo J. Soares, Rocky Hill, CT (US)

( * ) Notice: Subject to any disclaimer, the term of this patent is extended or adjusted under 35 U.S.C. 154(b) by 70 days.

(21) Appl. No.: 13/682,610

(22) Filed: Nov. 20, 2012

(65) Prior Publication Data

US 2013/0126600 A1 May 23, 2013

Related U.S. Application Data

(60) Provisional application No. 61/562,510, filed on Nov. 22, 2011.

(51) Int. Cl.
*G06F 17/00* (2006.01)
*G06Q 10/10* (2012.01)
*G06F 17/30* (2006.01)
*G06K 19/06* (2006.01)

(52) U.S. Cl.
CPC ........ *G06F 17/30011* (2013.01); *G06Q 10/109* (2013.01); *G06K 19/06037* (2013.01)
USPC .......................................................... 235/375

(58) Field of Classification Search
CPC ................................ G06Q 10/02; G07F 17/42
USPC .......................................................... 235/375
See application file for complete search history.

(56) References Cited

U.S. PATENT DOCUMENTS

| | | | |
|---|---|---|---|
| 7,090,136 B2 | 8/2006 | Muramatsu | |
| 7,424,976 B2 | 9/2008 | Muramatsu | |
| 7,912,426 B2 | 3/2011 | Masera | |
| 8,094,975 B2 | 1/2012 | Okochi | |
| 2009/0170425 A1 | 7/2009 | Matsumoto | |
| 2009/0325640 A1 | 12/2009 | Chava | |
| 2011/0016413 A1 | 1/2011 | Kalu | |
| 2011/0117960 A1 | 5/2011 | Miura | |
| 2012/0138688 A1* | 6/2012 | Young | 235/488 |

FOREIGN PATENT DOCUMENTS

| | | | |
|---|---|---|---|
| JP | 2002111909 A | 4/2002 | |
| JP | 2007038439 A | 2/2007 | |

* cited by examiner

*Primary Examiner* — Jamara Franklin
(74) *Attorney, Agent, or Firm* — Donald J. MacDonald; Coleman & MacDonald Law Office

(57) ABSTRACT

A system and method for the encoding of schedule data on a computing device and the retrieval, sharing and presentation of the schedule data on mobile computing devices is presented. The recurrent static portion of the schedule data is encoded by the computing device in a first two dimensional barcode image. Dynamic event data is encoded by the computing device in a second two dimensional barcode image, the second image containing only numeric data. The first and second images are acquired for processing by the mobile computing device which may display the barcode images for subsequent acquisition and processing by a second mobile computing device.

17 Claims, 8 Drawing Sheets

| 302 | 304 | 306 | 308 | 310 | 320 |
|---|---|---|---|---|---|
| Schedule Data Type | Database Type | Event Schedule Data Length | User/Event Id Length | Database ID No. | Database Name |
| 1 | 1 | 7 | 3 | 23456789012345 | Super Grocery |

| 510 | 520 |
|---|---|
| User/Event ID | User Name/Event Description |
| 001 | Mike |
| 002 | John |
| 004 | Jen |
| 005 | Allison |

11732 3456789012345SUPERGROCERY001MIKE
002JOHN003JENN004STEVEN005ALLISON

| | 710 | 720 | 730 | 740 |
|---|---|---|---|---|
| | Event Code | Event ID/User ID | Start Date and Time | End Date and Time |
| | 99 | 001 | 201208151100 | 201208151200 |
| | 99 | 001 | 201208161200 | 201208161300 |
| | 99 | 002 | 201208170800 | 201208171500 |
| | 99 | 003 | 201208150800 | 201208151130 |
| | 99 | 004 | 201208161030 | 201208161430 |
| | 99 | 005 | 201208170900 | 201208171330 |

| Organization Id | User Id | Start Date Time | End Date Time |
|---|---|---|---|
| 99 | 001 | 201208151100 | 201208151200 |
| 99 | 001 | 201208161200 | 201208161300 |
| 99 | 003 | 2001208171400 | 201208171500 |

| | | |
|---|---|---|
| Database Type | Multiple | 1510 |
| String Length | 17 | 1520 |
| ID Length | 3 | 1530 |
| Database ID | 23456789012345 | 1540 |
| Database Name | Super Grocery | 1550 |
| 001 | Mike | 1560 |
| 002 | John | 1570 |
| 003 | Jen | 1580 |
| 004 | Steve | 1590 |
| 005 | Allison | 1592 / 1594 |

| User ID | User Name | Description | Start DateTime | End DateTime |
|---|---|---|---|---|
| 001 | Mike | Super Grocery | 20120815 11:00 AM | 20120815 12:00 PM |
| 001 | Mike | Super Grocery | 20120816 12:00 PM | 20120816 4:00PM |

| Organization Id | User Id | Start Date Time | End Date Time |
|---|---|---|---|
| 99 | 001 | 201208151100 | 201208151200 |
| 99 | 001 | 201208161200 | 201208161300 |
| 99 | 003 | 2001208171400 | 201208171500 |

| | Database ID | 12345678901234 | |
|---|---|---|---|
| 1910 | Database Name | Capital University | |
| 1920 | Database Type | Single | |
| 1930 | 001 | English | 1982 |
| 1940 | 002 | Math | 1984 |
| 1950 | 003 | History | 1986 |
| 1960 | 004 | Chemistry | 1988 |
| 1970 | 005 | Art | 1990 |
| 1980 | | | |

| Event Description | Start Date Time | End Date Time |
|---|---|---|
| English | Aug 15 2012  11:00 am | Aug 16 2012  12:00 pm |
| Math | Aug 16 2012  12:00 pm | Aug 16 2012  1:00 pm |
| History | Aug 17 2012  2:00 pm | Aug 17 2012  3:00 pm |

SYSTEM AND METHOD FOR ACQUIRING AND SHARING SCHEDULING DATA

CROSS-REFERENCE TO RELATED APPLICATIONS

This application claims the benefit under 35 U.S.C. §119(e) of U.S. Provisional Application No. 61/562,510 filed Nov. 21, 2011, the entire disclosure of which is incorporated herein by reference.

FIELD OF THE INVENTION

The present invention generally relates to transferring scheduling data between electronic devices, and more particularly to a system and method for transferring schedule data to a mobile computing device.

BACKGROUND

In many current workplace and institutional environments, it is often cumbersome for an individual to acquire and record schedule data. This frequently entails the individual resorting to, memorization, handwritten transcription, or manual input into a personal computing device, or accessing an online server for schedule data important to them such as work schedules or class schedules. Access to online scheduling services is not frequently provided by work, educational and social institutions. The acts of memorization, handwritten transcription and manual input are often prone to error. These conditions create the potential for missed work assignments, classes, social and other events.

Accordingly, what is needed is a system and method for efficiently transferring large amounts of schedule data needed in workplace or institutional environment s to a mobile computing device such as a cellular telephone (e.g., smart phone) or other type of computing device.

SUMMARY OF THE INVENTION

Embodiments of the present invention provide a system and method for transferring schedule data to a mobile computing device. The schedule data is encoded into first and second two-dimensional barcodes. The first barcode representing static schedule data is encoded in alphanumeric format. A second barcode containing dynamic event schedule data is encoded in numeric-format. The first and second barcodes are transferable to a mobile computing device so that the schedule data can be displayed and used on the mobile computing device. In one embodiment the first and second barcodes are displayed on the mobile computing device for transfer to another mobile computing device.

In one embodiment, the static schedule data is processed for transfer to a barcode generator for encoding the data into a first two-dimensional barcode. The static schedule data may include descriptive alphanumeric information such as employee name, course description, and event title. A second barcode image is processed and the data is used to display an output representation of the schedule event. The descriptive data from the first image which corresponds to the event data of the second image is retrieved and incorporated into the created output representation.

An advantage of the present invention is that the encoding of data into separate static and dynamic images or barcodes produces substantial increase in the number of schedule events that may be stored in the more frequently occurring second data image.

Another advantage is that access to remote computing services is not required.

Another advantage is that not storing or needing to retrieve the data remotely improves the security and privacy of the schedule data.

A further advantage is that images acquired by the mobile computing device can be redisplayed for image acquisition by other mobile computing devices thus increasing the number of distribution points of the schedule data.

An additional advantage is that the errors of memorizing, transcribing, and manually entering data are avoided.

BRIEF DESCRIPTION OF THE DRAWINGS

FIG. 3 is a representation of data as utilized to initialize schedule data databases and processing.

FIG. 4 is a representation of a data initialization string.

FIG. 5 is a tabular representation of static schedule data.

FIG. 6 is a representation of a static schedule data string which also includes a data initialization string.

FIG. 13 represents an event schedule data string for a multiple user database type.

FIG. 14 depicts a tabular representation of event schedule data for a multiple user database type.

FIG. 15 depicts a tabular representation of static schedule data for a multiple user database type.

FIG. 16 depicts an exemplary output display for a multiple user database type.

FIG. 17 represents an event schedule data string for a single user database type.

FIG. 18 depicts a tabular representation of event schedule data for a single user database type.

FIG. 19 depicts a tabular representation of static schedule data for a single user database type.

FIG. 20 depicts an exemplary output display for a single user database type.

DETAILED DESCRIPTION

Figure 1:
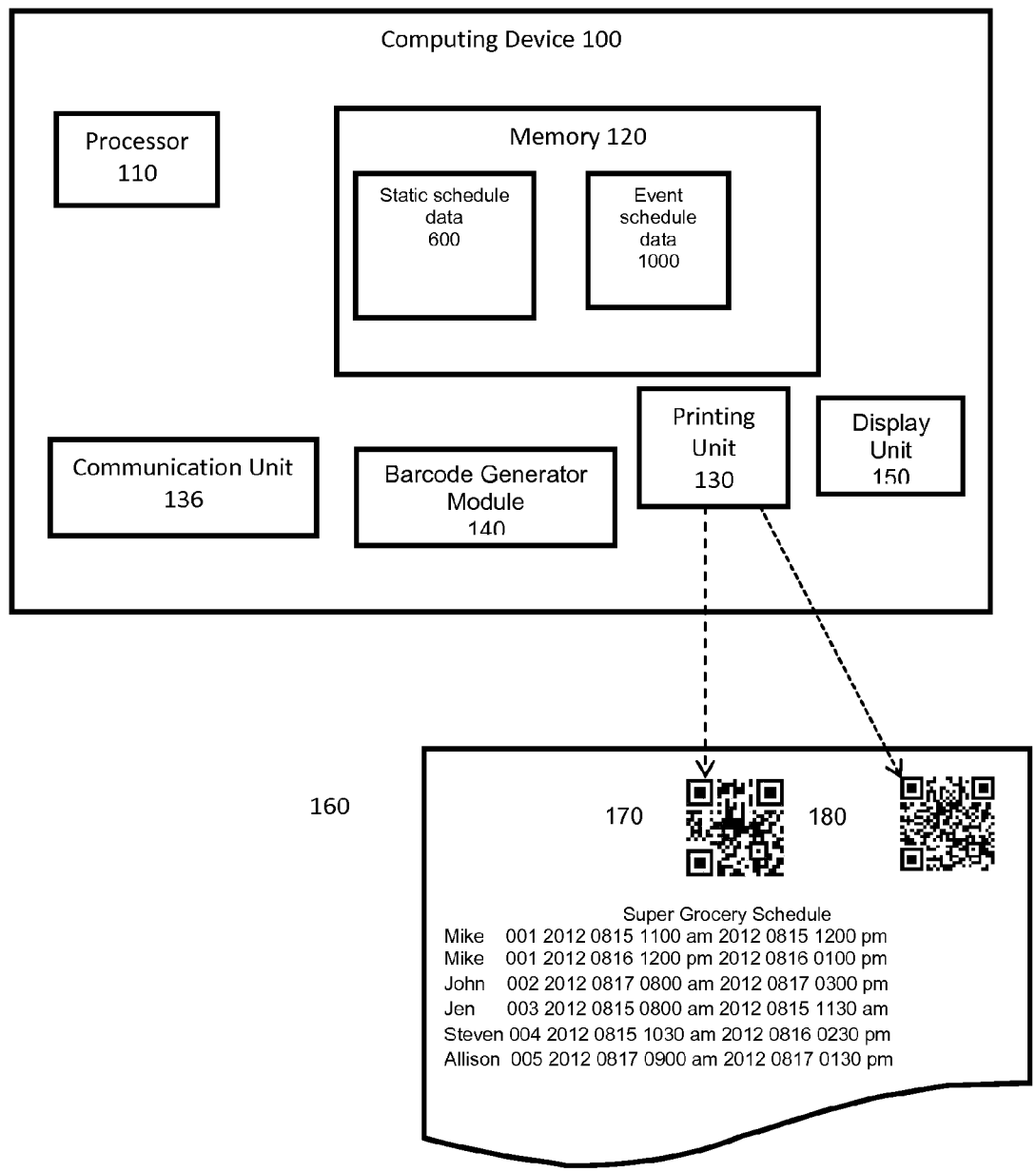
FIG. 1 is a representation of an embodiment of a computing device enabled to generate barcode images containing schedule data for subsequent retrieval and processing by a mobile computing device.

Disclosed is a computer implemented system and method for transferring schedule data from a computer system to a mobile computing device. Referring to FIG. 1, one embodiment of a system 10 includes a computer system 100; having a processor 110, a memory 120, a communications unit 136, a printer 130, a display 150 and a bar code generator 140. Contained within memory 120 is static schedule data S 600 and event schedule data 1000.

The system 10 also includes a mobile computing device 220 having a processor 230, a memory 240, an image acquisition unit 250, a display unit 260, a communications unit 270, and user interface or data input unit 272. The communications unit 270 includes an interface (not shown) to connect the computer system 100 to a network such as the Internet or other computer network.

The computer system 100 is configured to store schedule data in memory 120. In the FIG. 1 embodiment, the schedule data for a single company includes static schedule data 600 and event schedule data 1000. As discussed further hereinafter, the system separates the schedule data into static schedule data 600 and event schedule data 1000 to allow for efficient and fast transfer of schedule data to a mobile computing device. As depicted in FIG. 1, the static schedule data 600 and event schedule data 1000 is exemplary of a business organization and includes information describing a company's work schedule including company name, employee name, work start dates and times, and work end dates and times. In other embodiments, (e.g., a course schedule for an educational institution) the static schedule data 600 may include information describing various courses, whereas, the event schedule data 1000 may include the times and dates of the course meetings.

In FIG. 3, table 300 is a representation of an embodiment of data necessary to instruct computing device 100 and mobile computing device 220 to initialize databases for the storage and retrieval of static schedule data 600 and event schedule data 1000. Data elements of 300 include schedule data type 302, database type 304, event schedule data length 306, user or event Id 308, database Id number 310, and a database name 320.

FIG. 4 represents the data of table 300 after it is assembled by computing device 100 into a data initialization string 400.

In FIG. 5, table 500 depicts an embodiment of static schedule data elements comprising an Id field 510, which may be one of a user Id or event ID, and a description field 520 which is the textual description associated with a particular ID 510.

In FIG. 6, reference 600 depicts the complete static schedule data comprising the appending of data initialization string 400, and the Id 510 elements and description 520 elements from table 500.

Figures 7, 8, 9, 10:
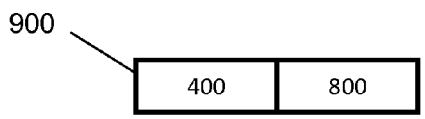
FIG. 7 is a tabular representation of multiple user event schedule data
FIG. 8 is a representation of event schedule data serialized into a single string.
FIG. 9 is a representation of a combined layout of data initialization and event schedule data.
FIG. 10 is a representation a data initialization string to which is appended event schedule data.

In FIG. 7, table 700 depicts one embodiment of event schedule data elements comprising event code 710, event id/user id 720, start date and time 730 and end date and time 740.

FIG. 8 depicts the results of computing device 100 having been instructed to assemble the data of table 700 into a data string 800, which constitutes the entirety of the data elements from table 700.

FIG. 9 represents a combination of the data initialization string 400 and data string 800.

FIG. 10 depicts the results of computing device 100 having been instructed to append data initialization string 400 and data string 800 to create an event schedule data string 1000.

In one embodiment, the static schedule data 600 and event schedule data 1000 are compressed and encrypted utilizing tools commonly known to those skilled in the art and processed by the barcode generator module 140 to produce a static schedule data barcode image 170 and an event schedule data barcode image 170 which are combined with human-readable textual representation of the static and event schedule data and printed by printing unit 130 as output report 160.

Figure 11:
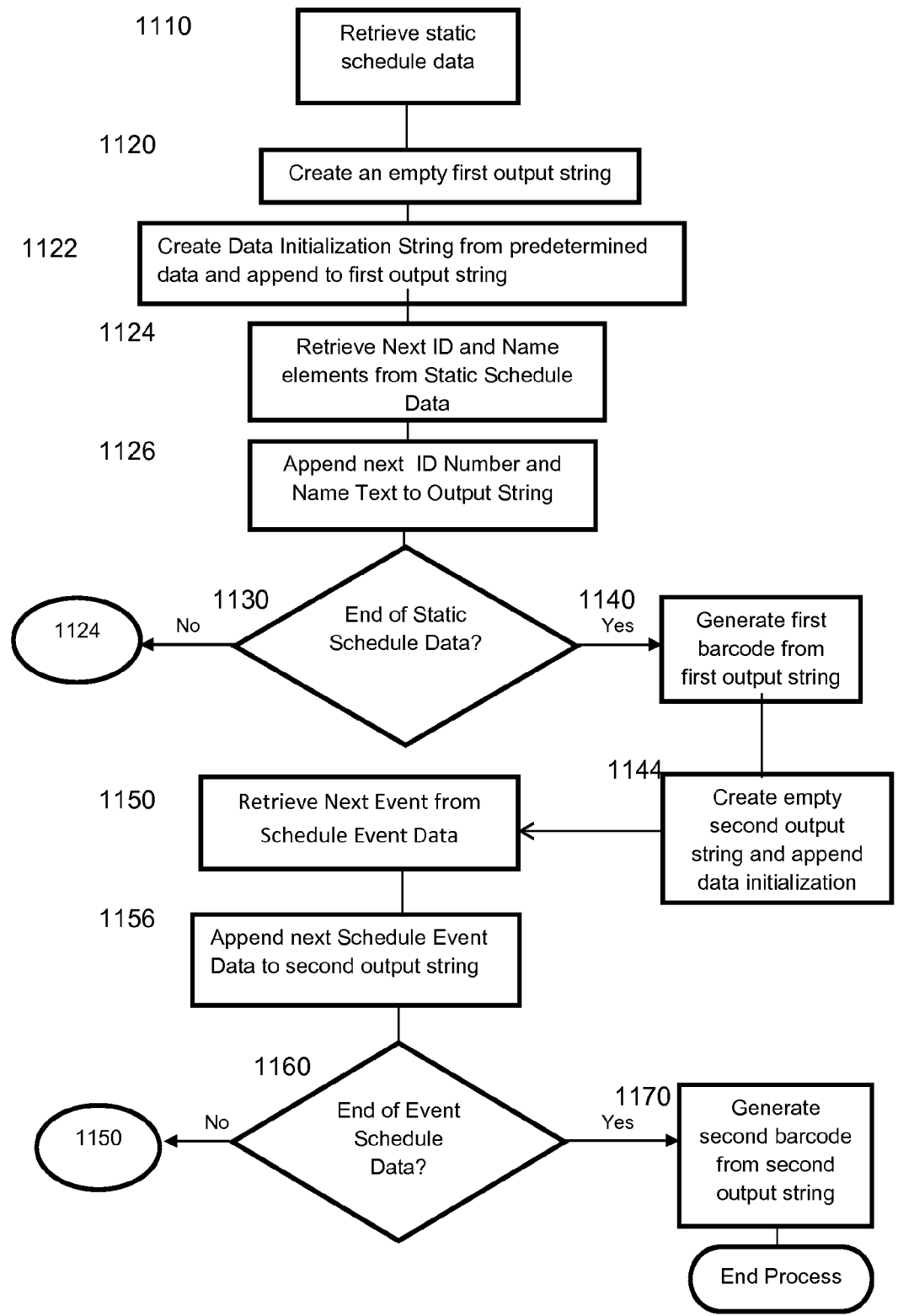
FIG. 11 depicts the processing steps for a computing device to generate a first barcode image of static schedule data and a second barcode image of event schedule data

Referring to FIG. 11, the process by which computing device 100 produces the static schedule data barcode image 170 is further depicted.

At step 1110 the static schedule data 600 is retrieved by computing device 100 from memory 120. Step 1120 depicts the creating of an empty first output string. At step 1122, a data initialization string 400 is assembled from the table 300 elements of initialization data comprising schedule data type 302, database type 304, event schedule data length 306, user id/event id length 308, database Id number 310, and database name 320 and appended to the first output string. At step 1124 the next available user/event id 510 and user name/event description 520 are retrieved from static schedule data 600 and are appended to the first output string. Step 1130 determines if the end of the static schedule data 600 has been reached. If not, the process repeats steps 1124, 1126 and 1130 until the end of the static schedule data 600 has been reached, at which time step 1140 passes the first output string to barcode generator module 140 to produce static schedule data barcode image 170.

Referring to FIG. 11, the process by which computing device 100 produces the event schedule data barcode image 180 is further depicted.

Step 1144 includes the creation of an empty second output string and the appending of the data initialization string 400 to the second output string. At step 1150, the next event data elements; event code 710, event id/user id 720, start date and time 730 are retrieved by computing device 100 from event schedule data 1000 stored in memory 120. At step 1156, the data elements 710, 720, 730 and 740 are appended to the second output string. Step 1160 determines if the end of the event schedule data 1000 has been reached. If not, the process repeats steps 1150, 1156 and 1160 until the end of the event schedule data 1000 has been reached, at which time step 1170 passes the second output string to barcode generator module 140 to produce event schedule data barcode image 180.

Figure 2:
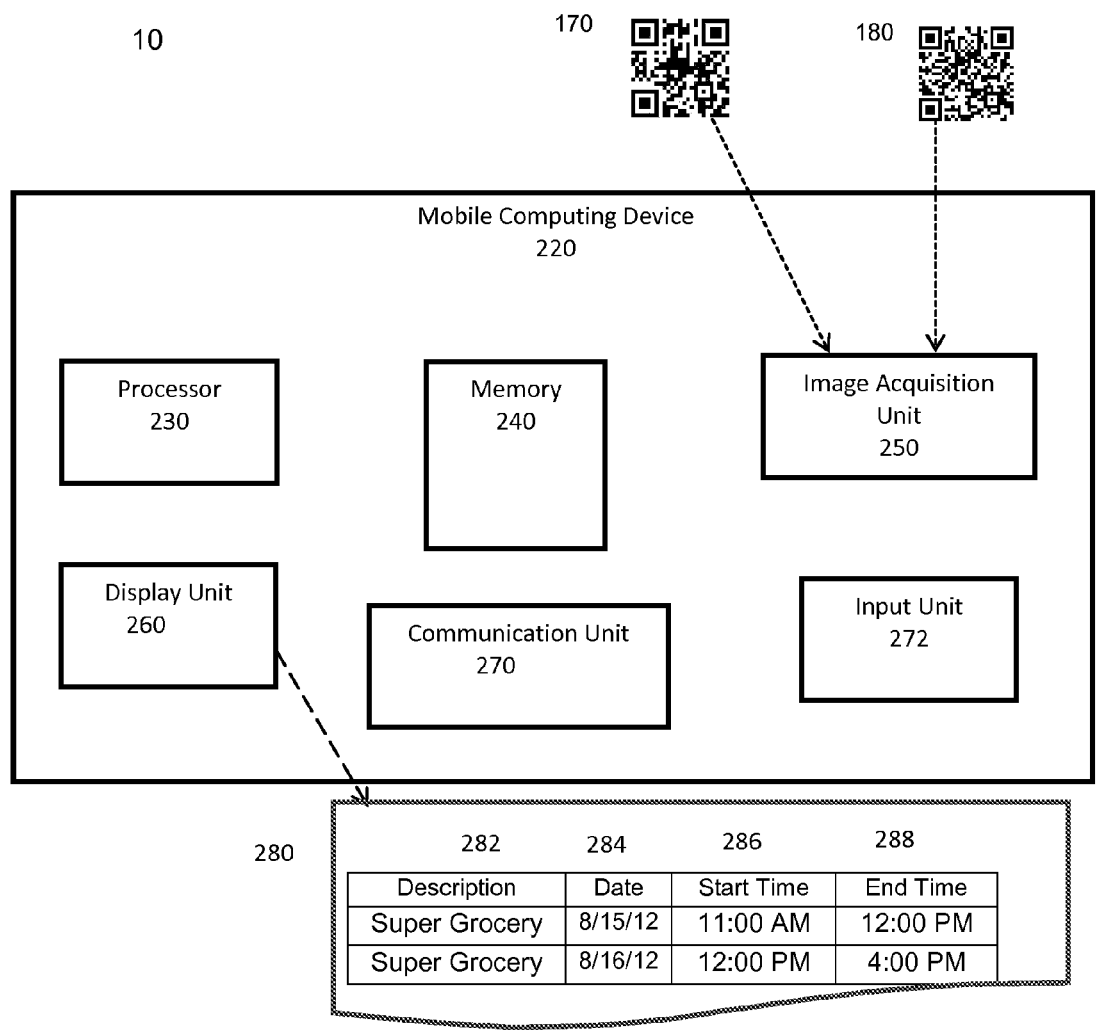
FIG. 2 representation of an embodiment of a mobile computing device enabled to process barcode images containing schedule data.

Referring to FIG. 2, an embodiment of the system further includes a mobile computing device 220, the mobile computing device comprising a processor 230, an associated memory 240, an associated image acquisition unit 250, an associated display unit 260, an associated communication unit 270, and an associated input unit 272.

The mobile computing device 220 is further configured to acquire and store two-dimensional barcode image 170 and two-dimensional barcode image 180, utilizing image acquisition unit 250. The textual content of the barcode images are then decompressed, decrypted and analyzed to determine the combination of schedule data to be included in display report 280 displayed by display unit 260.

In another embodiment, the mobile computing device 220 is configured to receive the static schedule data 600 utilizing associated communication unit 270 to receive the static scheduled data from computing device 100 and associated communication unit 136; communication unit 270 and communication unit 136 being respectively connected to a network comprising one of an internet network, an intranet network, a wireless network, or from another similarly configured remote computing source (not depicted).

In another embodiment, the mobile computing device 220, having acquired barcode image 170 and barcode image 180, is further configured to display the images on display unit 260 for subsequent acquisition by another similarly configured mobile computing device.

Figure 12:
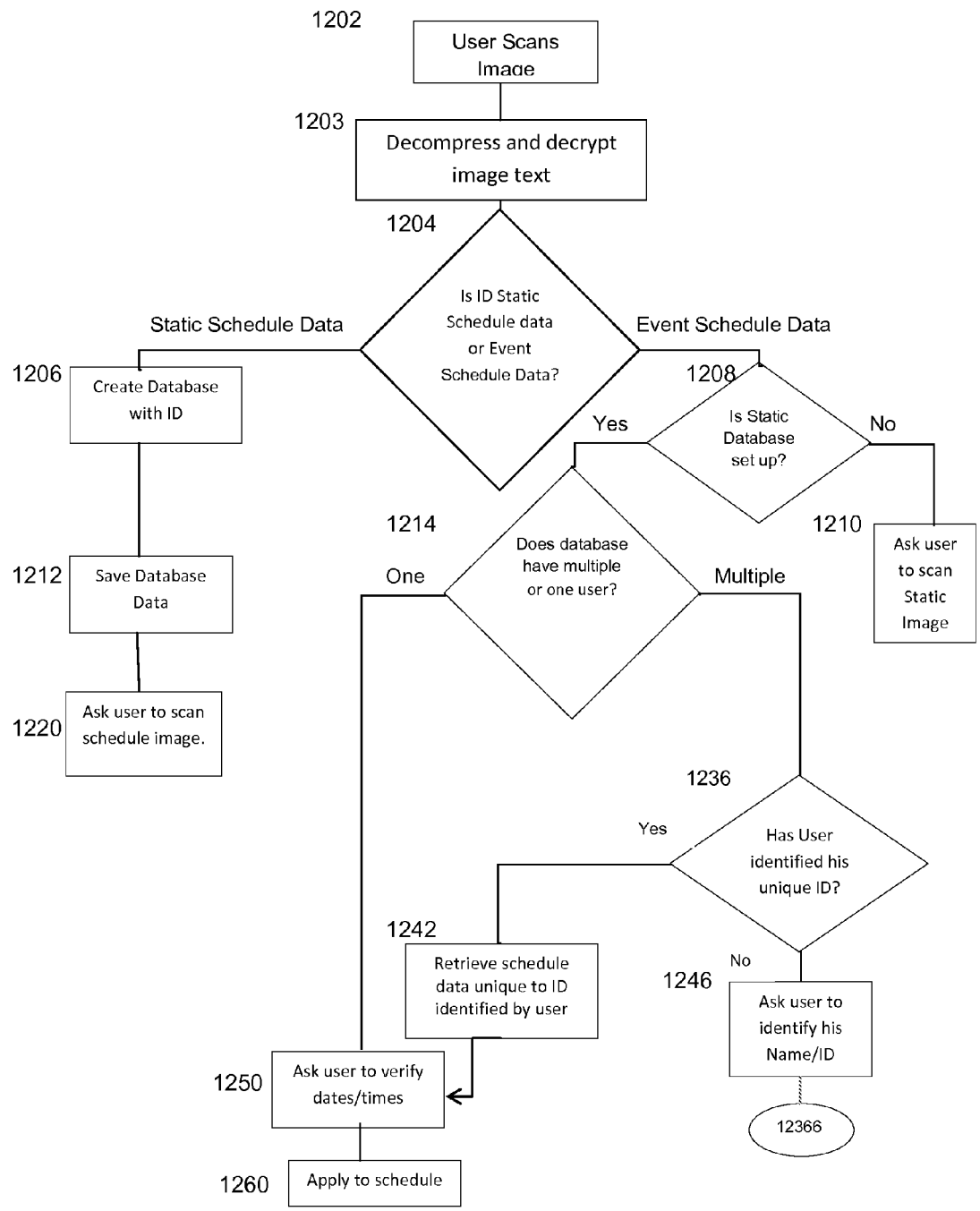
FIG. 12 depicts the processing steps for a mobile computing device to retrieve and process a first barcode image of static schedule data and a second barcode image of event schedule data.

FIG. 12 depicts in further detail, the process by which the barcode images are acquired, decoded and processed for display by mobile computing device 220. At step 1202 the mobile computing device acquires one of the two barcode images 170 or 180. The textual content of the barcode image is decompressed and decrypted at step 1203. By comparing the contents of the schedule type identifier contained in the text to predetermined values, step 1204 directs further processing based on the schedule type. If a static schedule data type is detected the text is further parsed and used to create a static schedule database in steps 1206 and saved in step 1212. At step 1220 a message is displayed to direct the user to scan an event schedule barcode 116.

If the schedule data type test of step 1204 results in a determination of event schedule data type, the stored static schedule database is next interrogated to determine that static schedule data for the current user identification id and organizational id exists. If not, step 1210 causes the user to be prompted on the display unit to scan a static schedule barcode image and the process resumes at step 1202

If at step 1204 a determination is made that a static schedule database exists, step 1214 analyses the static schedule data to determine that the databases are coded as single-user or multiple user databases. This determination is used to filter and control the display of static schedule data and corresponding event schedule data.

When a single-user environment is detected, the process proceeds to step 1250 to seek user input as to the date range of the event schedule data to be retrieved. The event schedule data is then retrieved and processed in step 1250 to produce a desired range of event schedule data and the associated descriptive elements from the static schedule data. Step 1260 then further process the data to produce the output display of static schedule data and event schedule data When a multiple user environment is detected, step 1236 determines if the user has logged in to establish his user name and identification. If not, the user is prompted at step 1246 to enter the user name and id and return to step 1236 for verification. When the user name and id has been entered and validated, step 1242 retrieves the event schedule data associated with the user id and retrieves only the static schedule data associated with the unique user id just verified. Processing continues at step 1250 and step 1260 as described previously.

The format of the output created at step 1260 differs between single user and multiple user environments. The format is depicted for the multiple user environment in FIGS. 7, 8, 9, and 10.

FIG. 8 is the representation in the memory 240 of mobile computing device 220 of acquired event schedule data, the representation showing an unparsed string 800 of event schedule data after decompression and decryption has been performed. FIG. 7 presents the unparsed string 800 after it has been parsed into rows of event schedule data table 700, comprising event code 710, event id/user id 720, start date and time 730 and end date and time 740.

FIG. 3 depicts the data initialization table 300 depicting the corresponding static schedule data comprising schedule data type 302, database type 304, event schedule data length 308, database id number 310 and database name 320. In the depicted example table 300, the database type 304 contains the value 1 which in one embodiment indicates a multiple user database.

FIG. 16 depicts the output to be displayed after applying the processing rules for a multiple user database. Exemplary display 1600 depicts the outputs for the logged-in user of the mobile computing device (e.g. User ID 001). The resultant output receives data from the static schedule database 600 where the current (logged-in) user id matches the user id 1610. The output display comprising user id 1610, user name 1620, database description 1630, start date and time 1640, and end date and time 1650.

The data content stored and displayed by mobile computing device 120 for the single-user environment is depicted in FIG. 17, FIG. 18, FIG. 19 and FIG. 20.

FIG. 17 is the representation in memory 240 of mobile computing device 120, of acquired event schedule data, the representation showing an unparsed string after decompression and decryption has been performed. FIG. 18 presents the data as parsed into event schedule data table 1800 comprising organization id 1810, user id 1820, start date and time 1830, and end date and time 1840.

FIG. 19 depicts the corresponding static schedule data table comprising database id 1910, database name 1920, database type 1930, and a list of associated event ids (1940, 1950, 1960, 1970, and 1980) and event descriptions (1982, 1984, 1986, 1988, and 1990).

FIG. 20 depicts the output to be displayed after applying the processing rules for a single user database. Exemplary display 2000 depicts the outputs for the logged-in user of the mobile computing device 220 (e.g. User ID 001). The resultant output receives data comprising event description 2010 from the static schedule data 600, and from event schedule data 1000, start date and time 2020 and end date and time 2030.

In another embodiment either the contents of exemplary display 1600, for a multiple user database, or the contents of exemplary display 1700, for a single user database, are transferred to the calendar application of the mobile computing device 220 for storage and display.

The specification presents a method for transferring schedule data to a mobile computing device, the schedule data stored at a computing device, the computing device comprising a processor, an associated memory, an associated printing unit, an associated display unit and an associated communication unit.

The method further comprises the computing device processing the schedule data to separate schedule data into static schedule data and event schedule data. Static schedule data would include exemplary descriptive data such as the name of the event, the name of the attendee and an event location. The characteristic of the static schedule data is that it is infrequently changed, and is represented and stored in alphanumeric format. The static schedule data also includes predetermined identifier numbers of at least one of schedule type number, organization identification number, user identification number, event identification number. Event schedule data includes exemplary organization identification number, user identification number, event identification number, date of event, beginning time of event and ending time of event. The characteristics of such event schedule data is that it frequently changes and is represented in numeric format.

The method further comprises storing a schedule type indicator number, the schedule type indicator number set to distinguish the schedule type as either a single user schedule or a multiple user schedule.

The method further comprises encoding static schedule data into a first two dimensional barcode image, the process of encoding including formatting the data in alphanumeric format subsequently applying data compression and data encryption techniques to the static schedule data prior to a least one of printing and displaying the first barcode image. The method further comprises encoding event schedule data into a second two dimensional barcode image, the process of encoding including formatting the data in numeric format and subsequently applying data compression and data encryption techniques to the event schedule data prior to a least one of printing and displaying the first barcode image.

The method further comprises printing the first and second barcodes on a printing unit associated with the computing device. Under other embodiments of the method, the method may comprise displaying the first and second barcodes on a display unit associated with the computing device, or alternatively, communicating the images to at least one of a plurality of mobile computing devices utilizing an associated communication unit of the computing device.

Another embodiment presents a method for acquiring schedule data by a mobile computing device, the mobile computing device comprising a processor, an associated memory, an associated image acquisition unit, an associated display unit, an associated communication unit and an associated input unit.

The method further comprises utilizing the image acquisition unit to acquire the first barcode image and the second barcode image.

The method further comprises processing the first two dimensional barcode by utilizing data decryption and decompression techniques and subsequently storing, in the associated memory, the static schedule data contained in the first barcode.

The method further comprises processing the second two dimensional barcode by utilizing data decryption and decompression techniques and subsequently storing, in the associated memory, the event schedule data contained in the second barcode.

The method further comprises processing the data of the first and second barcodes subsequent to decompression and decryption to utilize the schedule type identification number, the organization identification number and the user identification number to combine the data from the stored event schedule data with the data from the static schedule data. If the schedule type is single-user, the method comprises permitting the display of the entire contents of the static schedule where the schedule type, and user identification match the corresponding identifiers in the stored event schedule data. If the schedule type is multiple user, the method comprises permitting the display of only those data elements where each of schedule type, organization identifier and user identification match the corresponding identifiers in the store event schedule data The method further comprises depicting a schedule event with event schedule data and corresponding static schedule data on the associated display unit of the mobile computing device.

In another embodiment, the method comprises transferring the event schedule data and the corresponding static schedule data to a calendar application of the mobile computing device for display and storage.

The method further comprises displaying the acquired first barcode image and the acquired second barcode image on the associated display unit of the mobile computing device such that it may be acquired by the image acquisition unit of at least one of a plurality of other mobile computing devices.

In another embodiment, the mobile computing device is configured to receive the static schedule data from a remote computing device. The mobile computing device and the remote computing device being respectively connected to a network comprising one of an internet network, an intranet network, or a wireless network.

The invention can also be embodied and implemented using computer programming including computer software, firmware, hardware or any combination or subset thereof wherein the technical effect is to provide the system and method as described above. Any such resulting program, having computer-readable code means, may be embodied or provided within one or more computer-readable media, such as memory 120, 240, thereby making a computer program product, i.e., an article of manufacture, according to the invention. The computer readable media may be, for example, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network. The invention may comprise one or more processing systems such as a central processing unit (CPU), memory, storage devices, communication links and devices, servers, I/O devices, or any sub-components of one or more processing systems, including software, firmware, hardware or any combination or subset thereof, which embody the invention as set forth in the claims. User input may be received from a keyboard, mouse, pen, voice, touch screen, switch or any other means by which a human can input data, including through other programs such as application programs. One skilled in the art of computer science will easily be able to combine the software created as described with appropriate general purpose or special purpose computer hardware to create a computer system or computer sub-system embodying the method of the invention.

Various changes could be made in the above exemplary embodiments without departing from the scope of the invention. It is intended that the above description and accompanying drawings shall be interpreted as illustrative and not in a limiting sense. It is further to be understood that the steps described herein are not to be construed as necessarily requiring their performance in the particular order discussed or illustrated. It is also to be understood that additional or alternative steps may be employed with the present invention.

What is claimed is:

1. A method of transferring schedule data for a plurality of users to a mobile computing device, the method comprising;
    separating schedule data for a plurality of users into static schedule data and event schedule data, the static schedule data being substantially fixed information for the users including identification information for each of the users, the event schedule data being substantially non-fixed schedule data including scheduling information for events for each of the users;
    defining a first data string corresponding to the static schedule data, the first data string comprising alphanumeric data;
    defining a second data string corresponding to the event schedule data, the second data string comprising numeric-only data;
    encoding a first two dimensional barcode representing the first data string;
    encoding a second two dimensional barcode representing the second data string, the second data string being configured to maximize a number of events storable in the second barcode;
    the first barcode and second barcode being transferable to a mobile computing device.

2. The method of claim 1 wherein the step of encoding the first two dimensional barcode further comprises encoding the first data-string using at least one of data compression and data encryption techniques.

3. The method of claim 1 wherein the step of encoding the second two dimensional barcode further comprises encoding the second data string using at least one of data compression and data encryption techniques.

4. The method of claim 1 further comprising displaying at least one of the first and second barcodes for transferring the barcode to a mobile computing device.

5. The method of claim 1 further comprising printing at least one of the first and second barcodes for transferring the barcode to a mobile computing device.

6. A computer implemented system for transferring schedule data to a mobile computing device, the system comprising:
a processor configured to:
separate schedule data for a plurality of users into static schedule data and event schedule data, the static schedule data being fixed information for the users including identification information for each of the users, the event schedule data being non-fixed schedule data including scheduling information for events for each of the users;
define a first data string corresponding to the static schedule data, the first data string comprising alphanumeric data;
define a second data string corresponding to the event schedule data, the second data string comprising numeric-only data;
a barcode generator coupled to the processor and configured to generate a first two dimensional barcode representing the first data string corresponding to the static schedule data;
the barcode generator configured to generate a second two dimensional barcode representing the second data string corresponding to the event schedule data, the second data string being configured to maximize a number of events storable in the second barcode;
the system further comprising at least one of a display device and printer for displaying-at least one of the first barcode and second barcode; and wherein
the static schedule data and the event schedule data being transferrable to a mobile computing device via the first and second barcodes.

7. The system of claim 6 wherein the processor is further configured to encode the first data string using at least one of data compression and encryption techniques.

8. The system of claim 6 wherein the processor is configured to encode the second data string using at least one of data compression and encryption techniques.

9. A method of acquiring schedule data on a mobile computing device, the method comprising:
capturing an image of a first barcode, the first barcode being two-dimensional and representing static schedule data for a plurality of users, the static schedule data being encoded in alphanumeric format;
extracting and storing the static schedule data from the first barcode;
capturing an image of a second barcode, the second barcode being two-dimensional and representing event schedule data for the plurality of users, the event schedule data being encoded in numeric-only format;
extracting and storing the event schedule data from the second barcode;
generating a schedule for at least one of the plurality of users based on the static schedule data and event schedule data; and
displaying the schedule via the mobile device.

10. The method of claim 9 wherein the step of processing to extract and store the static schedule data further comprises at least one of decompressing and decrypting the static schedule data.

11. The method of claim 9 wherein the step of processing to extract and store the event schedule data further comprises at least one of decompressing and decrypting the event schedule data.

12. The method of claim 9 wherein the step of displaying the schedule further comprises combining a portion of the static schedule data with a portion of the event schedule data.

13. The method of claim 9 further comprising displaying the image of at least one of the first and second barcodes for acquisition by another mobile computing device.

14. A non-transitory computer-readable medium storing instructions adapted to be executed by a processor to perform a method, the method comprising:
capturing an image of a first two dimensional barcode, the first barcode representing static schedule data encoded in alphanumeric format for a plurality of users;
processing the first barcode to extract and store the static schedule data;
capturing an image of a second two dimensional barcode, the second barcode representing event schedule data encoded in numeric-only format for the plurality of users;
processing the second barcode to extract and store the event schedule data;
generating a scheduled based on the static schedule data and event schedule data; and
displaying the schedule.

15. The non-transitory computer-readable medium of claim 14 wherein the instructions for processing the first barcode to extract and store the static schedule data further comprises instructions for at least one of decompressing and decrypting the static schedule data.

16. The non-transitory computer-readable medium of claim 14 wherein instructions for processing the second barcode to extract and store the event schedule data further comprises instructions for at least one of decompressing and decrypting the event schedule data.

17. The non-transitory computer-readable medium of claim 14 further comprises instructions for displaying at least one of the first barcode image and the second barcode image for subsequent acquisition by another mobile computing device.

* * * * *